United States Patent
Ma et al.

(10) Patent No.: US 8,334,499 B2
(45) Date of Patent: Dec. 18, 2012

(54) OPTICAL ANGLE OF ARRIVAL MEASUREMENT SYSTEM AND METHOD

(75) Inventors: Jian Ma, Thousand Oaks, CA (US); Bruce K. Winker, Ventura, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 525 days.

(21) Appl. No.: 12/401,027

(22) Filed: Mar. 10, 2009

(65) Prior Publication Data

US 2010/0230577 A1   Sep. 16, 2010

(51) Int. Cl.
*H01J 3/14* (2006.01)
*G01C 21/02* (2006.01)
*G01B 11/14* (2006.01)

(52) U.S. Cl. ........... 250/216; 250/203.3; 356/615

(58) Field of Classification Search ............ 250/216, 250/203.3, 203.4, 203.6, 206, 206.1, 206.2; 356/141.5, 615
See application file for complete search history.

(56) References Cited

U.S. PATENT DOCUMENTS

| | | | | |
|---|---|---|---|---|
| 4,794,245 A | * | 12/1988 | Auer | 250/206.2 |
| 5,640,241 A | * | 6/1997 | Ogawa | 356/615 |
| 2003/0180692 A1 | * | 9/2003 | Skala et al. | 434/22 |
| 2008/0117531 A1 | * | 5/2008 | Asper et al. | 359/710 |

* cited by examiner

*Primary Examiner* — Thanh Luu
(74) *Attorney, Agent, or Firm* — Koppel, Patrick, Heybl & Philpott

(57) ABSTRACT

An optical angle of arrival measurement system uses an optical element to form at least one narrow width line on a focal plane array (FPA) which is oblique with respect to the FPA's row and column axes and which traverses at least two rows or columns along its length; forming two perpendicular narrow width lines in a cross-pattern is preferred. Interpolating the position of the lines on the FPA provides coordinates that can be used to calculate the optical angle of arrival in accordance with $\theta x = A(x) \cdot \tan^{-1}(x/f)$, and $\theta y = B(y) \cdot \tan^{-1}(y/f)$, where f is the focal length of the optical element, and $A(x)$ and $B(y)$ are parameters that account for optical distortion and other imperfections of the system. The resolution $\delta\theta$ of the angle of arrival measurement can be improved to at least $\delta\theta \sim (d/n)/f$, where d is the FPA pixel width and n is the length in pixels of the imaged line.

22 Claims, 4 Drawing Sheets

OPTICAL ANGLE OF ARRIVAL MEASUREMENT SYSTEM AND METHOD

BACKGROUND OF THE INVENTION

1. Field of the Invention

This invention relates generally to an optical angle of arrival measurement system.

2. Description of the Related Art

High precision and large field of view optical angle of arrival measurement is a critical task in adaptive optics, laser communications, target tracking, optical surveying, and many other applications. Current solutions are limited either by resolution or field of view (FOV) due to inadequate focal plane array (FPA) size and detector noise. Conventionally, a lens converges incoming light from a fixed location point source onto an FPA that has M (row)×N (column) pixels. The focused spot on the FPA is circular (e.g., having a Gaussian intensity distribution) and occupies about Y×Y detector pixels. The position (x, y) of the focused spot on the FPA is determined, from which the optical angle of arrival is calculated as $\theta_x \propto x/f$, $\theta_y \propto y/f$, where f is the focal length of the lens. Using a simple peak searching algorithm, the resolution ($\delta\theta$) of the angle of arrival measurement will be proportional to d/f, where d is the FPA pixel width, the FOV in horizontal will be proportional to $$\tan^{-1}\left(\frac{Nd}{f}\right),$$

and the FOV in vertical will be proportional to $$\tan^{-1}\left(\frac{Md}{f}\right).$$

Improving resolution requires reducing pixel size (d) and/or increasing focal length (f), both of which reduce the FOV. The state-of-the art solution is to fabricate the FPA with small pixel size and a large number of pixels. However, such an FPA is expensive to fabricate. Furthermore, a large number of pixels will slow down the frame rate of the sensor and increase the processing time required to determine the spot location. In general, the precision of any similar optical direction of arrival sensor is limited by the accuracy of the ability to determine the location of a single focused spot on the FPA with subpixel precision.

SUMMARY OF THE INVENTION

An optical angle of arrival measurement system is presented which overcomes the problems noted above, providing improved resolution without any reduction in FOV.

The present system uses an optical element to convert incoming light (typically a collimated beam (or beams) of light, or one or more point sources located at a distance much larger than the focal length of the lens) into at least one narrow width line on an FPA. The width of each line is preferably equal or approximately equal to the FPA pixel width d. Each line is oblique with respect to the FPA's row and column axes and traverses at least two rows or columns (preferably three rows or columns) along the length of the imaged line. An optical element which converts the incoming light into two perpendicular narrow width lines that form a cross-pattern on the FPA is preferred. A means for interpolating the position of the line or lines on the FPA is preferably used to provide the x, y coordinates that can be used to calculate the optical angle of arrival in accordance with $\theta x = A(x) \cdot \tan^{-1}(x/f)$, and $\theta y = B(y) \cdot \tan^{-1}(y/f)$, where f is the focal length of the optical element, and A(x) and B(y) are parameters that account for optical distortion and other imperfections of the system. When arranged per the present invention, the resolution ($\delta\theta$) of the angle of arrival measurement will be proportional to (d/n)/f, where d is the FPA pixel width and n is the length in pixels of the imaged line.

These and other features, aspects, and advantages of the present invention will become better understood with reference to the following description and claims.

BRIEF DESCRIPTION OF THE DRAWINGS

FIG. 1d is a diagram illustrating the use of an optical bandpass filter in front the optical element used in the system shown in FIG. 1a.

FIG. 2d is a diagram illustrating the use of an optical bandpass filter in front the optical element used in the system shown in FIG. 2a.

FIG. 3b is a diagram illustrating the use of an optical bandpass filter in front the optical elements used in the system shown in FIG. 3a.

DETAILED DESCRIPTION OF THE INVENTION

Figure 1A:
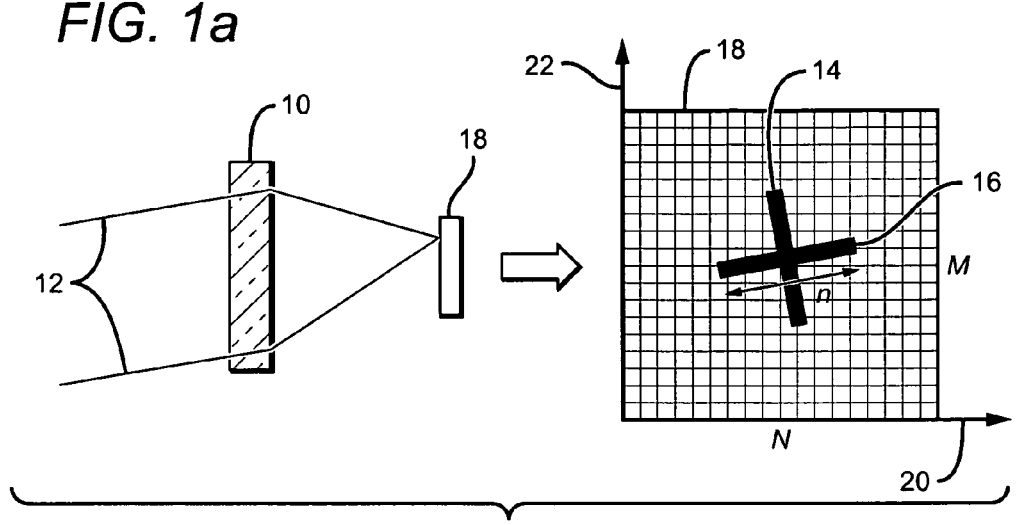
FIG. 1a is a diagram illustrating the basic principles of an optical angle of arrival measurement system per the present invention.

FIG. 1a illustrates the general principles of an optical angle of arrival measurement system in accordance with the present invention. The system is generally useful for determining the angle of arrival for incoming light produced by a collimated beam, such as a laser beam, or a point light source at a distance much larger than the distance between the optical element and the FPA, such as an LED source, or a star.

The system uses one or more optical elements 10 which receive incoming light 12 and form at least one narrow width line 14, 16 on an FPA 18. The FPA in FIG. 1a is comprised of an M×N row and column array of pixels. The system is arranged such that the imaged lines are oblique with respect to the FPA's row and column axes 20, 22, with each traversing at least two rows or columns (preferably three rows or columns) along its length. The width of the line or lines is preferably equal or approximately equal to the FPA pixel width d. An optical element which forms two perpendicular narrow width lines that form a cross-pattern on the FPA, as shown in FIG. 1a, is preferred, though a system which forms just a single narrow width oblique line could also be used.

Figure 1B:
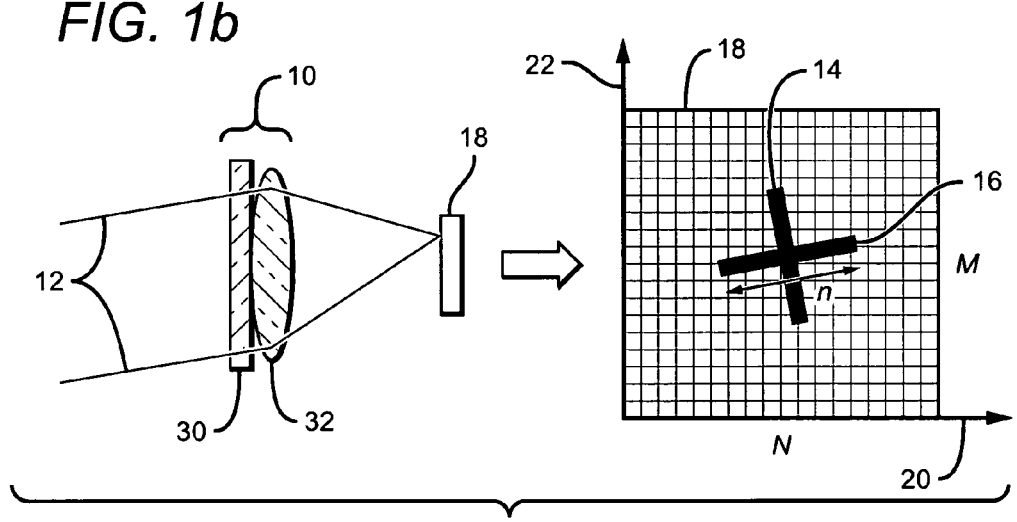
FIG. 1b is a diagram illustrating a preferred method of using the combination of a diffractive optical element (DOE) and a lens to form a cross-pattern on an FPA.

FIG. 1b illustrates a preferred method, in which optical element 10 consists of a diffractive optical element (DOE) 30 and a lens (or a group of lenses) 32. The DOE forms a preferred cross-pattern and the lens focuses the cross-pattern on the FPA as sharp lines.

Figure 1C:
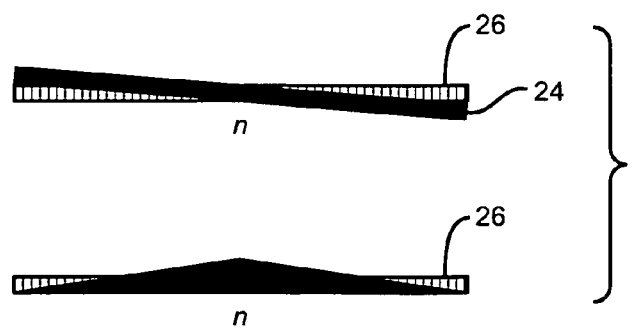
FIG. 1c is a diagram illustrating one means by which the intensity distribution of an imaged line on one FPA row or column is measured.

The optical angle of arrival is calculated in accordance with $\theta x = A(x) \cdot \tan^{-1}(x/f)$, and $\theta y = B(y) \cdot \tan^{-1}(y/f)$, where f is the focal length of the optical element and x and y are coordinates based on the position of the imaged lines on the FPA, and A(x) and B(y) are parameters that account for optical distortion and other imperfections of the system. A means for interpolating the position of the line or lines on the FPA is preferably used to provide the x, y coordinates. One way in which these coordinates can be determined is shown in FIG. 1c. An imaged line 24 having a width approximately equal to the width of an FPA pixel is oblique with respect to an FPA row 26, such that it traverses at least two rows or columns along its length, with three rows or columns being preferred. In FIG. 1, line 24 traverses three rows: row 26, and the rows immediately above and below row 26. Making the imaged lines oblique enables the system to determine "peak" pixel locations; the x, y coordinates indicated by these locations can then be used to calculate optical angle of arrival. As shown in FIG. 1c, a simple "peak search" algorithm can be used to determine the optical intensity distribution on row 26 of the FPA, with the x and y coordinates of the brightest pixel providing the data needed to calculate optical angle of arrival.

Each imaged line has a length defined as n FPA pixels, where $n \leq N$. When arranged per the present invention, the resolution ($\delta\theta$) of the angle of arrival measurement is proportional to (d/n)/f, where d is the FPA pixel width. When the imaged lines are perfectly straight, a simple peak search algorithm as described above is able to find the position of a crossed lines pattern with a resolution of 1/n of an FPA pixel, provided that the non-uniformities of the line intensity and the sensitivity of the FPA pixels are calibrated out. A resolution of (d/n)/f represents a factor of n improvement over the conventional method without any reduction in FOV.

By using an interpolation algorithm instead of peak search, it may be possible to determine the position of the peak of the light distribution with sub-pixel resolution (d'). In this case, the angle of arrival resolution is proportional to (d' ln)/f, where d' is smaller than d. Choosing n~N, the system provides 2-3 orders of magnitude improvement in angle of arrival resolution relative to a method that forms a circular focused light spot on an FPA.

Because the incoming light is converged into a line of length n pixels, the pixel signal-to-noise ratio (SNR) is reduced by a factor of n in comparison with a system that forms a single focused spot on the FPA when the number of incoming photons is limited. However, it is possible to improve the overall SNR by fitting one or more functions to the row and column signal data. If the line intensity is uniform, a simple linear function of photons/pixel vs pixel location can be applied to the imaged lines.

However, the oblique line formed by the optical element may have other shapes; for example, in some cases, the line may be parabolic by design or due to lens distortion. For these situations, higher order nonlinear terms can be added to the data fitting function. Usually, a pair of $2^{nd}$ order polynomials, of the form: $x = a_0 + a_1 y + a_2 y^2$; $y = b_0 + b_1 x + b_2 x^2$, are sufficient.

There are many other ways in which row and column signal data might be fit to a straight or curved line. In principal, any kind of light pattern can be formed on the FPA, and an associated algorithm might be employed to interpolate the location of the pattern on the FPA; this technique may improve the resolution of measuring the angle of incoming light and may serve to improve SNR.

There are a number of different ways in which optical element 10 can be implemented. For example, optical element 10 can be the combination of a diffractive optical element (DOE) 30 and a lens 32, as illustrated in FIG. 1b. The lens may comprise one lens or a group of lenses, and would typically be placed between the DOE and FPA 14 (preferably right behind the DOE) such that the desired light distribution pattern is formed on the FPA. A DOE is able to create a unique diffraction pattern, which is defined by the number of diffracted beams created by the DOE and the relative direction in which the diffracted beams travel from the DOE. To produce the diffraction pattern, the DOE can be a computer-generated hologram with holographic fringes formed on the surface of a substrate (for example, a glass substrate) through chemical etching, laser scribing, stamping or other fabrication methods. The DOE can also be a thin or thick volume hologram with holographic fringes formed inside the volume of a holographic medium through exposure to light interference patterns. Using an image lens behind the DOE, the diffracted beams are focused forming a sharp diffraction pattern, such as the cross-pattern, on the FPA.

Figure 1D:
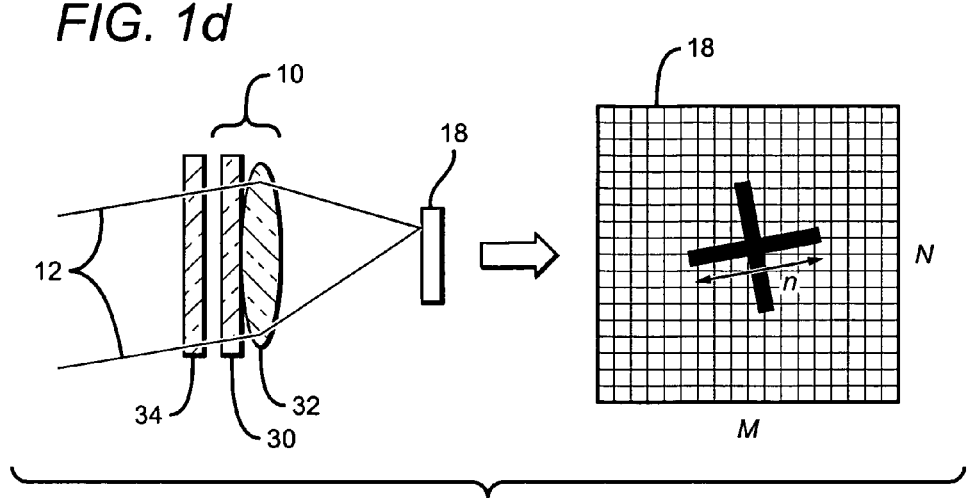

Optical element 10, such as a DOE and lens, typically operates with incoming light having a predetermined design wavelength, and over a limited range of wavelengths—such as within approximately +/−150 nm—around the design wavelength. Note that the design wavelength can be selected from a wide range: generally, any wavelength from the UV to near IR. To reduce the ambient background noise, an optical bandpass filter—preferably a narrow bandpass, high out-of-band rejection, large FOV optical filter—should be installed in front of the optical element. An example is shown in FIG. 1d, in which an optical bandpass filter 34 is placed in front of DOE 30.

Figure 2A:
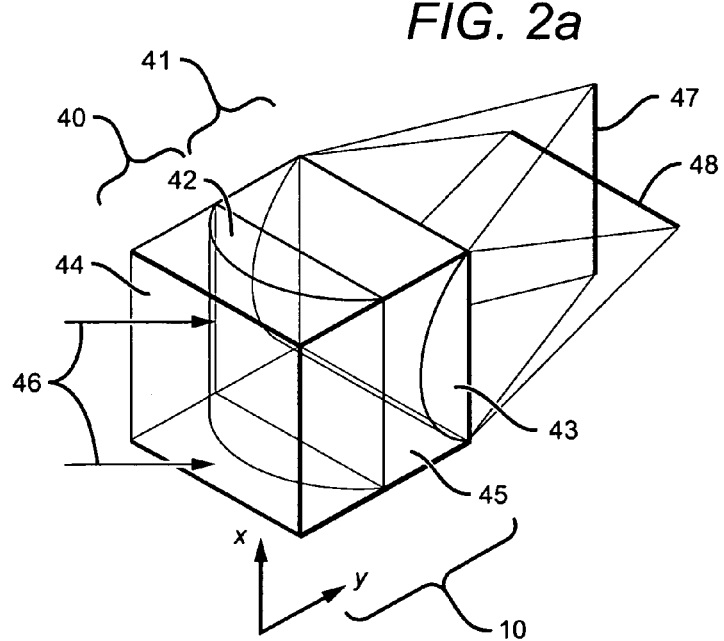
FIGS. 2a-2c are diagrams illustrating the use of birefringent cylindrical lenses as an optical element for an optical angle of arrival measurement system per the present invention.

Another possible way of implementing optical element 10 is shown in FIG. 2a. Here, the lines forming the cross-pattern are generated using two orthogonal uniaxial birefringent cylindrical lens assemblies 40, 41. Each birefringent lens assembly consists of a positive cylindrical lens 42, 43 formed from birefringent material and a negative cylindrical lens 44, 45 formed from an isotropic (non-birefringent) material. Preferably, one lens assembly would have a focusing power in the x-direction, for the x-polarization (or y-polarization) component of the light only, and the other lens would have a focusing power in the y-direction, for the y-polarization (or x-polarization) component of the light only. When so arranged, an incoming light beam 46 with random or circular polarization forms cross-shaped lines 47, 48 on the FPA. The pair of birefringent lens assemblies is slightly rotated with respected to the FPA such that the lines forming the cross-pattern are slightly oblique with respect to the FPA's row and column axes and traverse at least two rows or columns (preferably three rows or columns) along the length of the imaged line. Note that a birefringent cylindrical lens assembly might alternatively be arranged such that the positive cylindrical lens is formed from an isotropic material and the negative cylindrical lens is formed from a birefringent material.

Figure 2B:
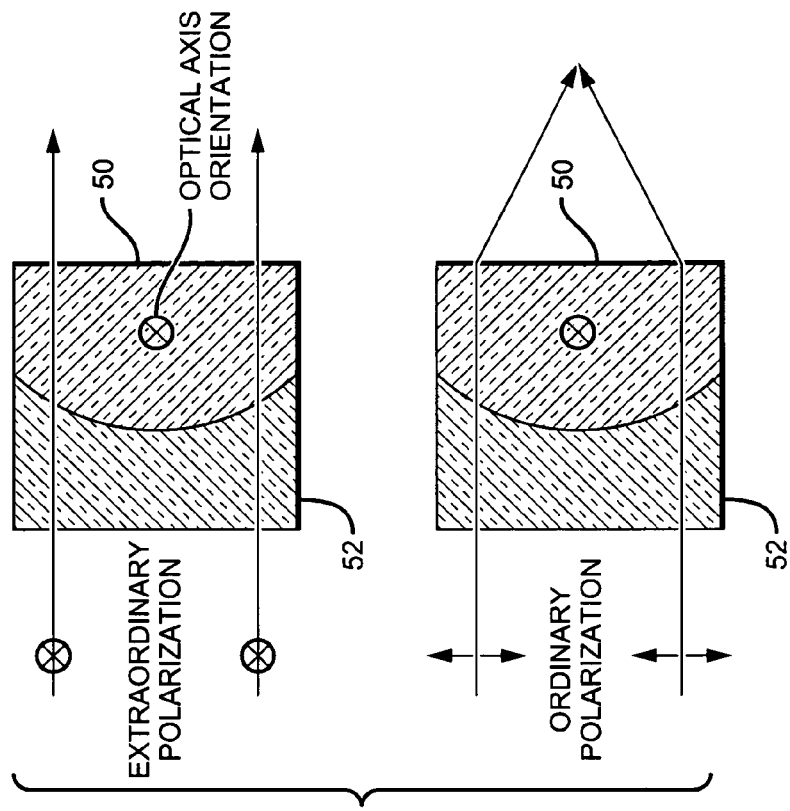
Figure 2C:
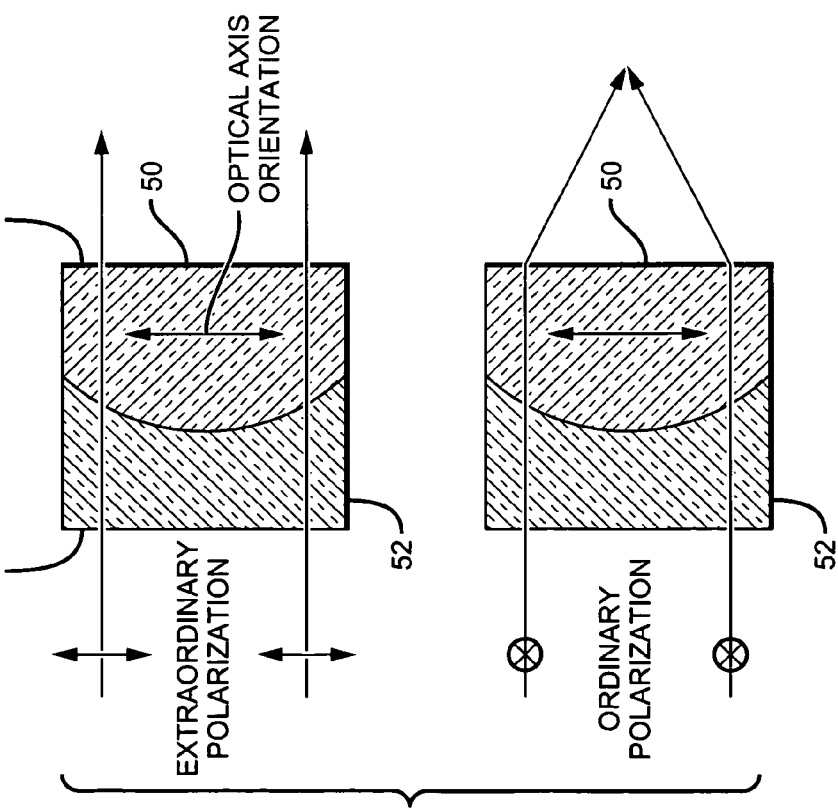

With reference to FIGS. 2b-2c, the birefringent lenses 50 are preferably constructed with a uniaxial birefringent material (refractive indices: $n_o$, $n_e$) and a non-birefringent material (e.g. glass) 52 (refractive index: n). Indices $n_o$ and $n_e$ refer to the ordinary and extraordinary refractive indices respectively of a crystal birefringent optical material. Light that has its electric field oriented (polarized) normal to the optical axis of the uniaxial birefringent material experiences the ordinary refractive index, while light whose electric field vector has a component parallel to the optical axis experiences the extraordinary refractive index. When the optical wave is at an angle such that the electric field orientation is between 0° and 90° with respect to the optical axis, the electric field can be decomposed into two waves—the ordinary wave and the extraordinary wave, which experience the ordinary refractive index $n_o$ and extraordinary refractive index $n_e$, respectively. When the refractive index of the non-birefringent lens component is chosen to be equal to the extraordinary refractive index of the birefringent lens component [$n=n_e$, $n_o>n_e$, for example, birefringent material Calcite ($n_o=1.658$ and $n_e=1.486$) and Schott glass N-FK5 ($n=1.486$ at the wavelength of 632.8 nm) can be used to form such a lens], the extraordinary light polarization experiences no lens refractive power and is transmitted unaffected, while the ordinary light polarization is focused to a line on the FPA. Alternatively, the refractive index of the non-birefringent lens component could be chosen to be equal to the ordinary refractive index of the birefringent lens component [$n=n_o$], in which case the ordinary ray is transmitted unaffected while the extraordinary polarization is focused to a line on the FPA.

FIGS. 2b and 2c describe two equally valid schemes: in FIG. 2b, the optical axis lies in the plane of birefringent lens 50, whereas in FIG. 2c, the optical axis lies normal to the plane of lens 50.

Pairs of birefringent cylindrical lens assemblies may be arranged with their cylinder axes arranged orthogonal to each other as in FIG. 2a, with their optical axes oriented as in FIG. 2b. When a random or circular polarized light beam illuminates such a pair of birefringent cylindrical lens assemblies, the light is focused into a cross pattern on the FPA. When the light arrives at the first birefringent cylindrical lens assembly (40 in FIG. 2a), light polarized in the y-direction experiences the ordinary refractive index of birefringent lens 42 and is focused to a line in the y direction, while light polarized in the x-direction experiences the extraordinary refractive index of birefringent lens 42 and is unaffected. When the light arrives at the second birefringent cylindrical lens assembly (41), light polarized in the y-direction experiences the extraordinary polarization of birefringent lens 43 and is unaffected, while light that is polarized in the x-direction experiences the ordinary refractive index of birefringent lens 43 and is focused to a line in the x direction. This results in a cross-pattern being formed on the FPA.

Birefringent lenses fabricated with other methods may also be used. Such methods include using liquid crystal materials, Fresnel zone plates, photorefractive volume holographic lenses, etc.

Figure 2D:
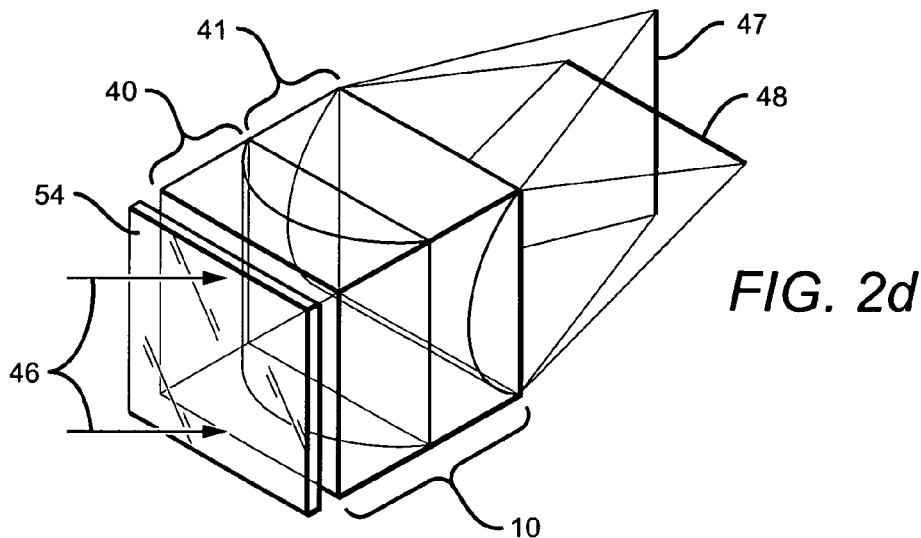

As noted above, an optical bandpass filter can be installed in front of the optical element to reduce ambient background noise. This is illustrated in FIG. 2d for a system in which the optical element is two orthogonal birefringent cylindrical lens assemblies. Here, an optical bandpass filter 54—preferably a narrow bandpass, high out-of-band rejection, large FOV optical filter—is placed in front of birefringent cylindrical lens assembly 40.

Figure 3A:
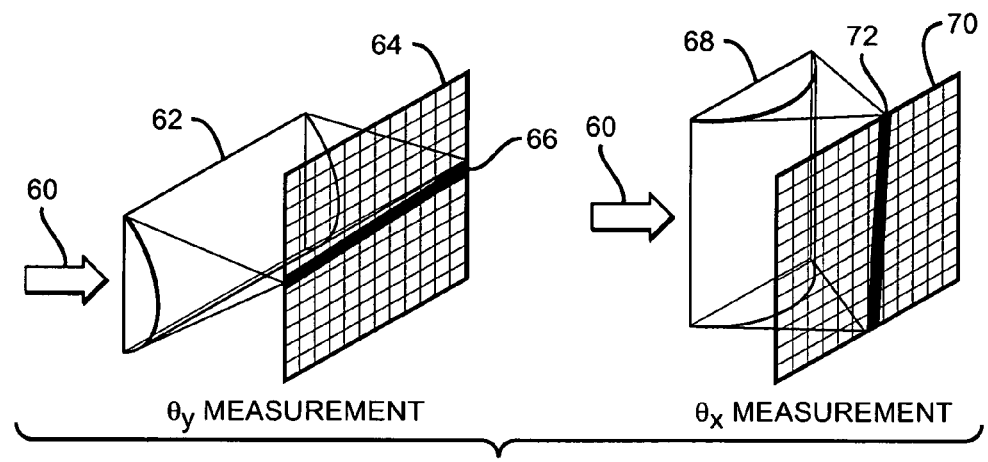
FIG. 3a is a diagram illustrating the use of two non-birefringent cylindrical lenses and two FPAs to provide an optical angle of arrival measurement system per the present invention.
Figure 3B:
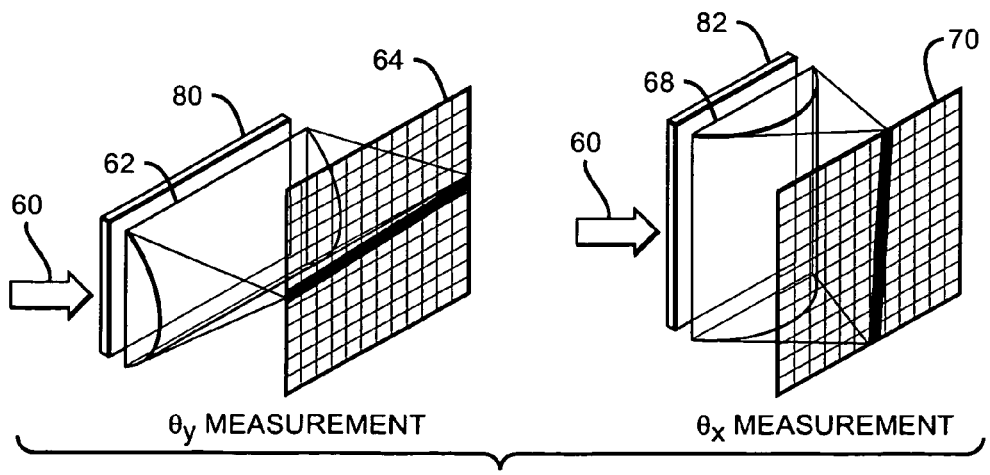

Another possible method of determining the optical angle of arrival in two orthogonal directions is to use two separate optical systems—each of which measures the incoming light in one direction, such that $\theta_x$ and $\theta_y$ are determined separately using the two FPAs; one possible arrangement is shown in FIG. 3a. Here, the optical systems comprise two orthogonally-oriented non-birefringent cylindrical lenses fabricated with non-birefringent material (e.g., glass) and two FPAs, arranged to form two perpendicular lines on respective FPAs. Incoming light 60 is focused by a first cylindrical lens 62 onto a first FPA 64, forming imaged line 66. Incoming light 60 is also focused by a second cylindrical lens 68, which is orthogonal to lens 62, onto a second FPA 70, forming imaged line 72. Cylindrical lenses 62 and 68 are rotated slightly with respect to their respective FPAs, so that the imaged lines are oblique with respect to their FPA's row and column axes. Note that a separate spherical lens might also be used; however, this reduces the length n of the lines on the FPAs, thereby reducing resolution while increasing SNR. To reduce ambient background noise, optical bandpass filters 80, 82 might be installed in front of non-birefringent cylindrical lenses 62 and 68 as shown in FIG. 3b.

Other possible configurations (not shown) use a single optical aperture which divides the incoming light into two beams that are either imaged onto separate FPAs, or focused onto different regions of a single FPA. Each of these configurations could be housed, for example, in a camera body which contains the complete lens to FPA assembly.

As noted above, several different types of optical elements might be used in a system as described herein. Employing a DOE and lens as optical element 10 as shown in FIG. 1b results in a compact system, as does using two birefringent lenses as shown in FIG. 2a. Using two FPAs as shown in FIG. 3 allows off-the-shelf lenses to be used.

There are many potential applications for an optical angle of arrival measurement system as described herein, including, for example, surveying, target tracking, attitude measurement, helmet tracking and lasercom. In general, the present system, which makes high resolution and high accuracy performance achievable with a small FPA array size, is useful wherever high angular resolution is required, and SNR is not constrained by background noise or the power of the incoming light source.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. An optical angle of arrival measurement system, comprising:
    a focal plane array (FPA) comprising an M row×N column array of pixels, said rows and said columns being parallel to a row axis and a column axis, respectively; and
    one or more optical elements, one of which is a diffractive optical element (DOE), arranged to converge incoming light from one or more point sources onto said FPA in a predetermined pattern of lines which are oblique with respect to the row and column axes of said FPA, such that the position of said lines on said FPA varies with the angular position of said point source(s) relative to said measurement system;
    wherein said predetermined pattern of lines comprises two perpendicular narrow width lines that form a cross-pattern, each of said lines being oblique with respect to said row and column axes and traversing at least two of said rows or columns along their respective lengths.

2. The system of claim 1, wherein said system is arranged such that each of said narrow width oblique lines traverses three of said rows or columns along their respective lengths.

3. The system of claim 1, wherein said narrow width oblique lines have a width equal or approximately equal to the FPA pixel width.

4. The system of claim 1, further comprising a means for interpolating the positions of said narrow width lines on said FPA.

5. The system of claim 3, wherein said means for interpolating the positions of said narrow width lines on said FPA provides x and y coordinates which represent the angle of arrival of said incoming light, said angle of arrival given by θx, θy, where θx=A(x)·tan$^{-1}$(x/f), and θy=B(y)·tan$^{-1}$(y/f), where f is the focal length of said optical elements, and A(x) and B(y) are parameters that account for optical distortion and other imperfections of the system.

6. The system of claim 3, wherein said means for interpolating the positions of said narrow width lines on said FPA comprises employing a peak search algorithm.

7. The system of claim 3, wherein said means for interpolating the positions of said narrow width lines on said FPA comprises determining the optical intensity distribution of the light converged on said FPA.

8. The system of claim 3, wherein said means for interpolating the positions of said narrow width lines on said FPA comprises fitting respective linear functions to the patterns of pixels illuminated by said lines.

9. The system of claim 3, wherein said means for interpolating the positions of said narrow width lines on said FPA comprises fitting respective nonlinear functions to the patterns of pixels illuminated by said lines.

10. The system of claim 9, wherein said nonlinear functions comprise second-order polynomials.

11. The system of claim 1, wherein said pixels have a width d, said optical elements have a focal length f, and said at least one narrow width oblique line is n pixels in length, said measurement system arranged such that its resolution δθ is proportional to (d/n)/f.

12. The system of claim 1, wherein said one or more optical elements further comprises one or more lenses between said DOE and said FPA.

13. The system of claim 1, wherein said incoming light is produced by a laser, light-emitting diode, or star.

14. The system of claim 1, wherein said optical elements are arranged to detect incoming light over a limited range of wavelengths.

15. The system of claim 1, further comprising an optical bandpass filter installed in front of said optical elements so as to limit the range of wavelengths reaching said optical elements.

16. The system of claim 15, wherein said optical bandpass filter is a narrow bandpass, high out-of-band rejection, large FOV optical filter.

17. The system of claim 1, wherein said FPA is employed within the body of a camera.

18. The system of claim 17, wherein said camera includes two of said FPAs, said camera comprising a single optical aperture and arranged to image the two perpendicular narrow width lines produced by said optical element on respective ones of said FPAs.

19. The system of claim 17, wherein said camera comprises a single optical aperture and is arranged to image the two perpendicular narrow width lines produced by said optical element onto different regions of a single FPA.

20. An optical angle of arrival measurement system, comprising:
a focal plane array (FPA) comprising an M row×N column array of pixels, said rows and said columns being parallel to a row axis and a column axis, respectively; and
one or more optical elements which include first and second orthogonal uniaxial birefringent cylindrical lens assemblies arranged to converge polarized incoming light from one or more point sources onto said FPA, said first birefringent cylindrical lens assembly having a focusing power in the x-direction for the x-polarization component of the light only and said second birefringent cylindrical lens assembly having a focusing power in the y-direction for y-polarization component of the light only, said first and second orthogonal uniaxial birefringent cylindrical lens assemblies arranged such that incoming light from said one or more point sources converges onto said FPA as two perpendicular narrow width lines, each of which is oblique with respect to said row and column axes and traverses at least two of said rows or columns along its length, such that the position of said lines on said FPA varies with the angular position of said point source(s) relative to said measurement system.

21. The system of claim 20, wherein each of said narrow width oblique lines has a width equal or approximately equal to the FPA pixel width.

22. An optical angle of arrival measurement system, comprising:
a focal plane array (FPA) comprising an M row×N column array of pixels, said rows and said columns being parallel to a row axis and a column axis, respectively; and
one or more optical elements which include first and second orthogonal uniaxial birefringent cylindrical lens assemblies arranged to converge polarized incoming light from one or more point sources onto said FPA, said first birefringent cylindrical lens assembly having a focusing power in the x-direction for the x-polarization component of the light only and said second birefringent cylindrical lens assembly having a focusing power in the y-direction for y-polarization component of the light only, said first and second orthogonal uniaxial birefringent cylindrical lens assemblies arranged such that incoming light from said one or more point sources converges onto said FPA as two perpendicular narrow width lines, each of which is oblique with respect to said row and column axes and traverses at least two of said rows or columns along its length, such that the position of said lines on said FPA varies with the angular position of said point source(s) relative to said measurement system;
wherein each of said first and second orthogonal uniaxial birefringent cylindrical lens assemblies comprises a positive cylindrical lens formed from birefringent material and a negative cylindrical lens formed from an isotropic material.

\* \* \* \* \*